Patented Dec. 21, 1943

2,337,337

UNITED STATES PATENT OFFICE 2,337,337

MOLDING COMPOSITION

Wilbert B. McCluer, Ralph W. Hufferd, and Frank J. Philippbar, Bradford, Pa., assignors to Kendall Refining Company, Bradford, Pa., a corporation of Pennsylvania No Drawing. Application August 3, 1940, Serial No. 351,181

6 Claims. (Cl. 106—285)

This invention relates to molding plastic compositions and articles produced therefrom.

The present invention relates more particularly to the production of molding plastic compositions and molded articles of the general class heretofore produced from tar acid and other synthetic resin compositions.

Various methods are applicable for the production of molded articles in accordance with the present invention. Depending upon the particular constitution of the plastic composition produced in accordance with the present invention, the molding may be effected under atmospheric temperature conditions employing relatively high pressures or at temperatures not usually in excess of 250° F.

In accordance with the invention, suitable molds are, generally speaking, made of hardened steel and highly polished. The mold is advantageously placed in a hydraulic press adapted to be suitably heated. When the composition is such as to lend itself to molding at atmospheric conditions, pressures up to 8,000 or 10,000 pounds per square inch may be employed. When higher temperatures are used, somewhat lower pressures may be employed, though where a dense product is desired, the higher pressures may also be utilized when molding articles at elevated temperatures.

The average molding time is usually from 3 to 5 minutes but may be longer.

Outstanding advantages of the present invention reside in the fact that the composition conforming to the present invention is self-lubricating in the molding operation, requiring no additional incorporation of a lubricating medium. Second, the molded articles produced in accordance with the present invention possess the unique characteristic that they improve in lustre and finish with handling and age, thus overcoming one of the great objections to molded articles heretofore produced from various synthetic resins and like compositions. Additionally, the plastic composition of the present invention is highly economical and enables the production of superior molded articles at lower costs.

In accordance with the present invention, a wide variety of plastic compositions suitable for producing molded articles for distinct uses may be produced.

In order to have a better appreciation of the adaptations of the invention, a discussion of the sources and manner of production of the basic constituents of the plastic composition will be given.

The basic constituent for plastic compositions conforming to the instant invention comprises paraffin base petroleum products which have undergone no thermal decomposition or chemical change other than occasioned by normal or vacuum distillation and derived from a crude oil containing not substantially in excess of 0.2% asphaltic like constituents (Holde method).

These paraffin base petroleum products comprise the high molecular weight naturally contained viscous materials that are precipitated from a warm solution (above 77° F.) of such paraffin base oil products in a hydrocarbon solvent which is gaseous at normal temperatures and which contains from two to four carbon atoms per molecule with a solvent-to-oil ratio in the solution of above about six to one as well as chemical condensation products thereof. These basic constituents have a relatively low iodine number, are virtually free from asphaltenes, and possess a high degree of resistance to oxidation. Blends of these materials with compatible moulding plastic compositions are also contemplated within the purview of this invention.

The paraffin base oil product may be a so-called "cylinder stock" or similar normal or vacuum distillation residual stock from a paraffin base crude, or a solvent separated wax, so long as the paraffin base oil from which it was derived has not been subjected to thermal decomposition or chemical change beyond that induced by normal fractional distillation.

Before discussing the novel molding compositions contemplated by this invention, it is desirable to briefly review the operations that result in the obtaining of the basic constituents used in producing these compositions.

While reference will be made more particularly to the use of propane in obtaining the basic constituents herein employed, it is to be understood that other hydrocarbon precipitants, e. g., normally gaseous hydrocarbons of from two to four carbon atoms, may likewise be used, and that propane is referred to as the preferred embodiment of the invention.

An exemplification of a preferred procedure for obtaining the primary or bonding constituents of the molding compositions herein described is as follows:

A so-called "cylinder stock" or similar normal or vacuum distillation residual stock from a paraffin base crude is charged to a propane dewaxing and precipitating operation. The specific character of the charge will depend somewhat on the viscosity and pour point of the ultimately desired oil product of the propane treatment. For example, if it is the purpose of the propane treatment to obtain a so-called "bright stock" having a S. S. U. viscosity of 150 at 210° F., a cylinder stock charging material will have approximately the following specifications:

| | |
|---|---|
| Viscosity _____S. S. U. at 210° F__ | 175 |
| Optical density (color) _____ | 2800 |
| A. P. I. gravity_____ | 25.6 |
| Conradson carbon residue_____per cent__ | 2.6 |
| Flash (Cleveland open cup) _____° F__ | 565 |

Where a bright stock having a viscosity at 210° F. of 120 S. S. U. and a zero pour point is the desired oil product of the propane treatment, the cylinder stock charge will have approximately the following specifications:

| | |
|---|---|
| Viscosity _____S. S. U. at 210° F__ | 165 |
| Optical density (color)_____ | 2700 |
| A. P. I. gravity_____ | 25.8 |
| Conradson carbon residue_____per cent__ | 2.25 |
| Flash (Cleveland open cup) _____° F__ | 560 |

Such a cylinder stock charging material is preferably subjected to propane treatment in the following manner:

The charging stock is mixed with propane and fed into a warm solution tank at a temperature of approximately 65° F. The cylinder stock propane solution is then transferred into a chiller and the pressure reduced until a temperature of the order of —20 to —54° F. is obtained, depending upon the desired pour point of the ultimate oil product. The chilling is effected by evaporation of propane in the well recognized manner, and make-up propane is added during the chilling operation so that a ratio of propane to oil of approximately three to one prevails at the end of the chilling cycle and at the time of filtration.

When the cylinder stock-propane solution has been sufficiently chilled, it is transferred to a filter feed tank and thence to an appropriate filter to secure separation of the wax from the chilled solution.

The propane oil solution which has been freed from undissolved wax in the filter is then subjected to a precipitating treatment in which propane is added until the propane oil ratio is raised to approximately eight to one and the temperature of this solution is elevated to a temperature above 77° F. and preferably to a temperature of approximately the order of 155 to 165° F., which results in the precipitation of high molecular weight naturally contained viscous materials.

While in the above exemplification the solvent dewaxing is described as occurring in advance of the precipitation from the warm hydrocarbon solution, it is desired to point out that the precipitation step may be effected in advance of dewaxing without materially modifying the character of the precipitate. In fact in some instances the initial precipitation from the warm solvent solution may be preferred particularly where wax separation is effected by centrifuging.

The precipitated material, separated from the warm propane solution either before or after dewaxing of the cylinder stock, may advantageously be subjected to further treatment to separate the same into relatively higher and lower viscosity materials.

Specifically when employing a warm propane solution of the paraffin base oil product having a temperature of the order of 160° F., the precipitate may be further separated into a series of different viscosity products by first adding propane and lowering the temperature to about 80° F., whereupon the higher viscosity materials separate, i. e., those having a viscosity at 210° F. of from 3000 to 5000 S. S. U., and thereafter progressively raising the temperature to approximately 160° F. with successive separation of materials ranging in viscosity from approximately 2000 S. S. U. at 210° F. down to approximately 400 S. S. U. at 210° F.

These thus precipitated materials and similar materials precipitated from hydrocarbon solvent solutions other than a propane solution represent high molecular weight naturally contained hydrocarbons of the paraffin base oil fraction from which they have been precipitated, the paraffin base oil being characterized in that it has a content of not substantially in excess of 0.2% of asphaltic like materials when determined according to Holde's method.

These natural high molecular weight high viscosity hydrocarbon materials which have undergone no thermal decomposition or chemical change may in some adaptations of the present invention be directly employed in the molding compositions.

For other specific adaptations of the present invention, it has been found desirable to employ chemical condensation products of these natural high molecular weight viscous hydrocarbon components of the paraffin base oil fraction. Such condensation products may advantageously be produced by air blowing the natural high molecular weight viscous materials under controlled temperature conditions.

Air blowing of the source materials results in an exothermic reaction, thus rendering the process at least partially self-sustaining without application of further extraneous heat, although it may be necessary to add extraneous heat, depending upon the particular type of source material being treated and the design of the particular vessel in which the air blowing operation is carried on. The rate of air blowing is so controlled as to maintain the temperature at approximately 450 to 575° F.

The mechanism of the chemical condensation of the complex natural viscous materials precipitated from warm hydrocarbon solutions of the paraffin base oils is not fully understood but is believed to be induced by the presence of air due to oxygen being taken up by certain of the molecules, after which molecules are condensed with a splitting off of water to yield a higher molecular weight chemically condensed product. These products may, for convenience, be termed "polymers," but it is to be understood that such designation is not intended to signify that they have resulted wholly from the union of like molecular structures.

The following represent typical illustrations for the production of the basic constituents contemplated for use in producing molding compositions in accordance with the instant invention.

(a) A natural high molecular weight viscous precipitate was derived from a paraffin base cylinder stock in the manner hereinabove outlined, and represents the heavier molecular weight portion separated from the overall warm propane solution precipitate at a temperature of approximately 80° F.

These natural occurring precipitated materials had the following properties:

Visc. S. S. U. at 210° F._____ 5250
Penetration 100 g. total wt. (A. S. T. M. D5-25) cm.×10⁻²__ Too soft to give a reading
Ball & ring softening point (A. S. T. M. D36-26)_____°F__ Below 80
Molecular wt. (avg.)_____ 1380
Iodine No. Wijs method_____ 57
Carbon atoms per double bond (avg.)_____ 32

Starting with this source material, the same was charged to a suitable apparatus for air blowing and initially heated to a temperature of approximately 500° F. accompanied by the introduction of air.

Care was exercised to avoid elevation of the temperature to a degree that would cause flashing. The air blowing in this case was conducted for approximately two hours with the temperature maintained within the range of from 480° to 500° F. This operation resulted in the production of a condensation product having the following characteristics:

Visc. S. S. U. at 210° F.
    Too viscous for ready determination
Penetration 100 g. total wt. (A. S. T. M. D5-25) cm.×10⁻²_____ 101
Ball & ring softening point (A. S. T. M. D36-26)_____°F__ 115
Molecular weight average_____ 1900
Iodine No. Wijs method_____ 41
Carbon atoms per double bond (avg.)_____ 44

It is to be noted that this product possessed a lower iodine number, a lower penetration, a higher softening point, and a much higher molecular weight than did the source material from which it was derived by condensation in the presence of air.

(b) The same viscous source material was used as in illustration (a). The air blowing was conducted under conditions similar to those in illustration (a) except that the air blowing was continued for a period of approximately nine hours. The resulting condensation product was found to possess the following characteristics:

Visc. S. S. U. at 210° F.
    Too viscous for ready determination
Penetration 100 g. total wt. (A. S. T. M. D5-25) cm.×10⁻²_____ 23
Ball & ring softening point (A. S. T. M. D36-26)_____°F__ 218
Molecular weight average_____ 2130
Iodine No. Wijs method_____ 39
Carbon atoms per double bond (avg.)_____ 46

(c) The source material for this operation differed somewhat from the source materials of illustrations (a) and (b) above in that it constituted a less viscous portion of the material which had been separated from the overall warm propane precipitate at a temperature of approximately 150° F. This somewhat less viscous source material had the following characteristics:

Visc. S. S. U. at 210° F_____ 746
Penetration 100 g. total wt. (A. S. T. M. D5-25) cm.×10⁻²__ Too soft to give a reading
Ball & ring softening point (A. S. T. M. D36-26)_____°F__ Below 80
Molecular weight average_____ 1090
Iodine No. Wijs method_____ 43
Carbon atoms per double bond (avg.)_____ 42

This viscous oil precipitate was subjected to air blowing in a manner comparable to that set forth in illustration (a) above, with the exception that during the latter stages of the air blowing the temperature was caused to rise to approximately 520° F. and the air blowing was continued for approximately 15 hours. The resulting condensation product thus produced possessed the characteristics shown in the following table:

Visc. S. S. U. at 210° F.
    Too viscous for ready determination
Penetration 100 g. total wt. (A. S. T. M. D5-25) cm.×10⁻²_____ 75
Ball & ring softening point (A. S. T. M. D36-26)_____°F__ 147
Molecular weight average_____ 1990
Iodine No. Wijs method_____ 33
Carbon atoms per double bond (avg.)_____ 55

(d) The source material in this illustration constitutes a high molecular weight viscous material separated from propane separated wax by treatment of the wax with additional propane and precipitating the high molecular weight viscous hydrocarbons from the warm propane wax solution at a temperature of approximately 165° F. This source material had characteristics as follows:

Visc. S. S. U. at 210° F_____ 543
Penetration 100 g. total wt. (A. S. T. M. D5-25) cm.×10⁻²____ To soft to give a reading
Ball & ring softening point (A. S. T. M. D36-26) °F_____ 106
Molecular wt. average_____ 1190
Iodine No. Wijs method_____ 35.9
Carbon atoms per double bond (avg.)____ 51

This viscous source material derived from wax was air blown in a manner comparable to that set forth under (a) above, with the exception that in the latter stages of the air blowing the temperature was caused to rise to approximately 570° F. and the blowing was continued for a period of approximately 22 hours, at which time the resulting product had characteristics as follows:

Visc. S. S. U. at 210° F__ Too viscous for ready determination
Penetration 100 g. total wt. (A. S. T. M. D5-25) cm.×10⁻²_____ 41
Ball & ring softening point (A. S. T. M. D36-26) °F_____ 315
Molecular wt. average_____ 2200
Iodine No. Wijs method_____ 35.2
Carbon atoms per double bond (avg.)____ 52

From the foregoing illustration, it is apparent that molding compositions of a wide variety of specific characteristics may be obtained from a paraffin base oil stock for use in accordance with the present invention.

A typical high molecular weight naturally contained viscous precipitate separated from a warm propane solution of a paraffin base cylinder stock shows the following penetration characteristics:

*Penetration (A. S. T. M. D5-25), cm.×10⁻²*

| Temp., °F. | 100 g. total wt. |
|---|---|
| 30 | 86 |
| 40 | 174 |
| 50 | 206 |
| 60 | 302 |
| 70 | |

A typical condensation product condensed from naturally contained high molecular weight viscous materials precipitated from a warm propane solution of a paraffin base stock shows the following penetration characteristics:

Penetration (A. S. T. M. D5-25), cm.×10⁻²

| Temp., °F. | 100 g. total wt. |
|---|---|
| 30 | 19 |
| 40 | 21 |
| 50 | 24 |
| 60 | 26 |
| 70 | 32 |
| 80 | 39 |
| 90 | 42 |
| 100 | 61 |

All of the foregoing materials are over 98% soluble in 88° Bé. petroleum naphtha, the non-polar solvents such as benzene, toluene, xylene, chloroform, carbon tetrachloride, and carbon disulfide. These materials are, however, highly resistant to acids and alkalies.

Molded articles of a wide variety of characteristics and for a great many uses may be produced in accordance with the present invention by suitably selecting the basic constituent of the molding composition and by properly combining the same with other appropriate ingredients to give a final molding composition best suited for the production of a particular article.

Among the articles that may be produced in accordance with the invention are molded articles used in the automobile industry such as control knobs, ignition parts and distributor heads; also, articles having adaptation in the field of builders' hardware. Particular illustrative uses are the production of battery boxes, burial vaults, tiles, handles, composition boards and the like.

Particularly advantageous molding compositions may be constituted as follows: using the chemical condensation product of illustrations (b) and (d) above, the same may be mixed with calcined infusorial earth, clay, kaolin, or the like filler in proportions of from 20 to 80 parts clay in 100 parts of the molding composition. It is, in many instances, however, desirable to incorporate in the molding composition some form of fibers such as cotton linters or fibrous asbestos. These materials may advantageously be incorporated in amounts from 10 to 15% of the total composition. Various other materials such as asbestine cork, rubber, rubber substitutes, chalk, sand, blown rock clay, phenolics and other plastic molding compounds may also be incorporated into molding compositions along with the hereinabove described high molecular weight viscous hydrocarbon products.

When molded articles possessing high electric insulation and dielectric properties are required, ground mica may be used as the filler. The molding composition of the present invention is particularly applicable to the production of such articles because of the high dielectric properties of the basic constituent of the composition; namely, the condensation product derived from the paraffin base oil in the manner hereinabove set forth. Many inorganic fillers such as powdered slate, gypsum, barium sulfate, calcium sulfate, zinc oxide, and china clay may be employed. As a general rule, larger proportions of such fillers are used where hardness is more important than strength. Where flexibility is required, the molding composition may advantageously include substantial amounts of rubber, neoprene, or the like. Coloring matter may be incorporated by adding pigments and dyes. There is no necessity in compositions of the present invention to employ added plasticizers or lubricants.

It is also within the contemplation of the present invention to use the basic constituents derived from the paraffin base oil in the manner above outlined blended with suitable proportions of such resinous materials as gilsonite, coal tar pitch, chlorinated rubber, coumarone-indene resins, tar acid resins, alkyd resins, and phenolic resins. In all such instances, however, the basic constituent of the molding composition may be represented by either a naturally contained high molecular weight viscous material precipitated from a warm normally gaseous two to four carbon atom hydrocarbon solvent solution of a paraffin base oil product or a chemical condensation product formed by chemically condensing such naturally contained high molecular weight materials. Generally speaking, where denser molded articles are desired, the condensation products will be used. In this connection, it is to be understood that the foregoing illustrations of the production of these products are merely exemplary and that by prolonged air blowing beyond the time period given in illustration (b) above, harder condensation products may be produced and the use of such products in molding compositions is contemplated by the present invention.

In some instances, the molding composition may be softened with a mineral spirit which is driven off by heat after the molded articles are produced.

Because of the control that may be exercised over the production of the basic constituent of the molding composition conforming to the instant invention, almost any specifications may be complied with. It is also possible to blend two or more of the materials, illustrated analyses of which are given in the illustrations (a) to (d) above, to obtain further variations in composition and constitution of the basic component of the molding composition. Furthermore, blends of the herein described high molecular weight viscous hydrocarbon materials with other petroleum products, such as, for example extracts from solvent refining operations, may be utilized advantageously in forming molding plastic compositions.

Having thus described the invention, what is claimed as new is:

1. A molding composition for producing molded articles comprising a filler and a chemical condensation product derived from a naturally contained high molecular weight viscous material precipitated from a warm solution of a paraffin base oil product in a normally gaseous hydrocarbon solvent having from two to four carbon atoms by air blowing at a temperature within the range of from 450° F. to 575° F., said chemical condensation product having a viscosity substantially above 2000 S. S. U. at 210° F. and being substantially 98% soluble in 88° Baumé naphtha.

2. A molding composition for producing molded articles comprising a filler and a chemical condensation product derived from a naturally contained high molecular weight viscous hydrocarbon material which has been separated by a warm propane solution from a paraffin base oil fraction that has undergone no thermal decomposition or chemical change beyond that induced by ordinary fractional distillation by air blowing at a temperature within the range of from 450° F. to 575° F., said chemical condensation product having a viscosity substantially above 2000 S. S. U. at 210° F. and being substantially 98% soluble in 88° Baumé naphtha.

3. A molding composition for producing molded articles comprising a filler and a chemical condensation product derived from a naturally contained high molecular weight viscous hydrocarbon material precipitated from a warm propane solution of a propane dewaxed cylinder stock derived from a paraffin base oil by air blowing at a temperature within the range of from 450° F. to 575° F., said chemical condensation product having a viscosity substantially above 2000 S. S. U. at 210° F. and being substantially 98% soluble in 88° Baumé naphtha.

4. A molding composition for producing molded articles, the major component of which constitutes a chemical condensation product derived from a naturally contained high molecular weight viscous material precipitated from a warm solution of a paraffin base oil product in a normally gaseous hydrocarbon solvent having from two to four carbon atoms by air blowing at a temperature within the range of from 450° F. to 575° F., said chemical condensation product having a viscosity substantially above 2000 S. S. U. at 210° F. and being substantially 98% soluble in 88° Baumé naphtha.

5. A molding composition for producing molded articles comprising an inorganic filler bonded by a mixture of chemical condensation products of naturally contained high molecular weight viscous materials precipitated from a warm solution of a paraffin base oil product in a normally gaseous hydrocarbon solvent having from two to four carbon atoms by air blowing at a temperature within the range of from 450° F. to 575° F., each of said chemical condensation products embraced in said mixture having a viscosity substantially above 2000 S. S. U. at 210° F. and each being substantially 98% soluble in 88° Baumé naphtha.

6. A molding composition for producing molded articles comprising a filler, a resin, and a chemical condensation product derived from a naturally contained high molecular weight viscous material precipitated from a warm solution of a paraffin base oil product in a normally gaseous hydrocarbon solvent having from two to four carbon atoms, by air blowing at a temperature within the range of from 450° F. to 575° F., said chemical condensation product having a viscosity substantially above 2000 S. S. U. at 210° F. and being substantially 98% soluble in 88° Baumé naphtha.

WILBERT B. McCLUER.
RALPH W. HUFFERD.
FRANK J. PHILIPPBAR.